United States Patent
Leitner et al.

(10) Patent No.: US 9,817,782 B2
(45) Date of Patent: *Nov. 14, 2017

(54) SYSTEM AND METHOD FOR A BUS INTERFACE

(71) Applicant: Infineon Technologies AG, Neubiberg (DE)

(72) Inventors: Thomas Leitner, Pregarten (AT); Johannes Meusburger, Linz (AT); Joachim Fliesser, Ennsdorf (AT)

(73) Assignee: Infineon Technologies AG, Neubiberg (DE)

( * ) Notice: Subject to any disclaimer, the term of this patent is extended or adjusted under 35 U.S.C. 154(b) by 136 days.

This patent is subject to a terminal disclaimer.

(21) Appl. No.: 14/324,844

(22) Filed: Jul. 7, 2014

(65) Prior Publication Data

US 2014/0325103 A1 Oct. 30, 2014

Related U.S. Application Data

(62) Division of application No. 13/361,770, filed on Jan. 30, 2012, now Pat. No. 8,775,714.

(51) Int. Cl.
*G06F 3/00* (2006.01)
*G06F 13/00* (2006.01)
(Continued)

(52) U.S. Cl.
CPC .......... *G06F 13/404* (2013.01); *G06F 13/287* (2013.01); *G06F 13/364* (2013.01); *G06F 13/4291* (2013.01)

(58) Field of Classification Search
CPC ................................. H04L 45/74; H04L 61/10
(Continued)

(56) References Cited

U.S. PATENT DOCUMENTS 5,305,355 A * 4/1994 Go ........................ G06F 15/177
340/4.21
5,317,693 A * 5/1994 Cuenod ................. G06F 9/4411
370/257
(Continued)

FOREIGN PATENT DOCUMENTS

CN 101706861 A 5/2010
CN 1905562 B 7/2010
(Continued)

OTHER PUBLICATIONS

Aktas, A.; Rao, K.R.; Wilson, J.; Ismail, M., "A single chip radio transceiver for 802.11a/b/g WLAN in 0.181-1 CMOS," Electronics, Circuits and Systems, 2003. ICECS 2003. Proceedings of the 2003 1Oth IEEE International Conference on, vol. 2, pp. 938,941, Dec. 14-17, 2003.

(Continued)

*Primary Examiner* — Faisal M Zaman
(74) *Attorney, Agent, or Firm* — Slater Matsil, LLP (57) ABSTRACT

In accordance with an embodiment, a method of operating a bus interface circuit includes detecting a start sequence on a plurality of input terminals, determining whether a first input terminal and a second input terminal is a data terminal and a clock terminal, respectively, or whether the first input terminal and the second terminal is a clock terminal and a data terminal, respectively. The method also includes routing the first input terminal to a data terminal and the second input terminal to a clock terminal if first input terminal and the second input terminal are determined to be a data terminal and a clock terminal, respectively, and routing the first input terminal to the clock terminal and the second input terminal to the data terminal if first input terminal and the second input terminal are determined to be a clock terminal and a data terminal, respectively.

20 Claims, 6 Drawing Sheets

(51) Int. Cl.
  *G06F 13/40* (2006.01)
  *G06F 13/42* (2006.01)
  *G06F 13/28* (2006.01)
  *G06F 13/364* (2006.01)

(58) Field of Classification Search
  USPC .................................................. 710/9, 316
  See application file for complete search history.

(56) References Cited

U.S. PATENT DOCUMENTS

| | | | |
|---|---|---|---|
| 5,710,890 | A | 1/1998 | Hermer |
| 6,282,130 | B1 | 8/2001 | Cernea et al. |
| 6,617,901 | B1 * | 9/2003 | Kuhn ................... H03K 3/0372 |
| | | | 327/202 |
| 6,832,283 | B2 * | 12/2004 | Boesinger ............. H04L 12/403 |
| | | | 710/104 |
| 7,158,574 | B2 | 1/2007 | Vishakhadatta et al. |
| 7,584,305 | B2 | 9/2009 | Hsieh |
| 7,788,438 | B2 | 8/2010 | Kuo et al. |
| 8,232,869 | B2 * | 7/2012 | Bennett ................. H04L 12/403 |
| | | | 340/10.1 |
| 8,775,714 | B2 * | 7/2014 | Leitner ............... G06F 13/4291 |
| | | | 710/10 |
| 2003/0093598 | A1 | 5/2003 | Park |
| 2005/0066045 | A1 | 3/2005 | Johnson et al. |
| 2005/0080975 | A1 | 4/2005 | Elledge et al. |
| 2006/0002407 | A1 * | 1/2006 | Sakamoto ............... H04L 12/24 |
| | | | 370/402 |
| 2006/0059280 | A1 | 3/2006 | Gossmann et al. |
| 2006/0195639 | A1 * | 8/2006 | Yang .................... G06F 13/4291 |
| | | | 710/110 |
| 2008/0313312 | A1 | 12/2008 | Flynn et al. |
| 2008/0320187 | A1 | 12/2008 | Kim et al. |
| 2010/0109678 | A1 | 5/2010 | Wong |
| 2011/0307632 | A1 * | 12/2011 | Hueber ............... H04L 61/2038 |
| | | | 710/3 |
| 2012/0221769 | A1 | 8/2012 | Ware et al. |
| 2012/0324131 | A1 | 12/2012 | Chang |

FOREIGN PATENT DOCUMENTS

| | | |
|---|---|---|
| CN | 102111174 A | 6/2011 |
| CN | 102289415 A | 12/2011 |
| KR | 20070092685 | 9/2007 |

OTHER PUBLICATIONS

Luy, Johann-Friedrich; Mueller, T.; Mack, T.; Terzis, A., "Configurable RF receiver architectures," Microwave Magazine, IEEE, vol. 5, No. 1, pp. 75,82, Mar. 2004.

MIPI Alliance, "MIPI® Alliance Specification for RF Front-End Control Interface," Version 1.10—Jul. 26, 2011, MIPI Board Approved Nov. 2, 2011, MIPI Alliance, Inc., 90 pages.

* cited by examiner

PRIOR ART

FIG. 1a

PRIOR ART

SYSTEM AND METHOD FOR A BUS INTERFACE

This application is a divisional and claims the benefit of U.S. Non-Provisional application Ser. No. 13/361,770, issued as U.S. Pat. No. 8,775,714, filed on Jan. 30, 2012, which application is hereby incorporated herein by reference in its entirety.

TECHNICAL FIELD

An embodiment of the invention relates generally to electronic circuits and methods, and more particularly to a system and method for a bus interface.

BACKGROUND

In addition to having a radio frequency (RF) transceiver, many modern mobile communication platforms also use further front end components such as power amplifiers, active antenna tuners, low noise amplifiers, and antenna switches. Moreover, in multiple antenna systems, such as multiple input multiple output (MIMO) systems, and multiple protocol systems, the RF system may have a multitude of various selectable and configurable components that support each particular signal path and/or protocol. Many of these multiple radio frequency components are controllable by a digital bus in order to provide control and configuration in various operational modes.

One such digital interface bus is based on a standardized protocol developed by the MIPI Alliance called the radio front-end (RFFE) control interface described in the "MIPI® Alliance Specification for RF Front-End Control Interface," version 1.10-26 Jul. 2011, which is incorporated herein by reference in its entirety. In particular, the MIPI interface is a low complexity interface targeted toward RF systems using semiconductor processes in which logic devices may be potentially costly, and therefore can be implemented in a minimum number of logic gates. The MIPI RFFE control interface bus contains its own power supply voltage, and data is transmitted via a CLK line and a DATA line. Each RFFE slave device coupled to the MIPI RFFE bus is identifiable via a slave identifier, a manufacturer identifier, and a product identifier. A relatively high clock frequency of 26 MHz is used to for the RFFE bus in order to facilitate timing-critical functionality across multiple devices.

SUMMARY OF THE INVENTION

In accordance with an embodiment, a method of operating a bus interface circuit includes detecting a start sequence on a plurality of input terminals, determining whether a first input terminal and a second input terminal is a data terminal and a clock terminal, respectively, or whether the first input terminal and the second terminal is a clock terminal and a data terminal, respectively, based on detecting the start sequence. The method also includes routing the first input terminal to a data terminal and the second input terminal to a clock terminal if first input terminal and the second input terminal are determined to be a data terminal and a clock terminal, respectively, and routing the first input terminal to the clock terminal and the second input terminal to the data terminal if first input terminal and the second input terminal are determined to be a clock terminal and a data terminal, respectively.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be redescribed in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a slave bus interface circuit for use in a radio frequency front-end (RFFE) control interface. Embodiments of the present invention may also be applied to bus interface circuits directed toward other applications.

Figure 1A:
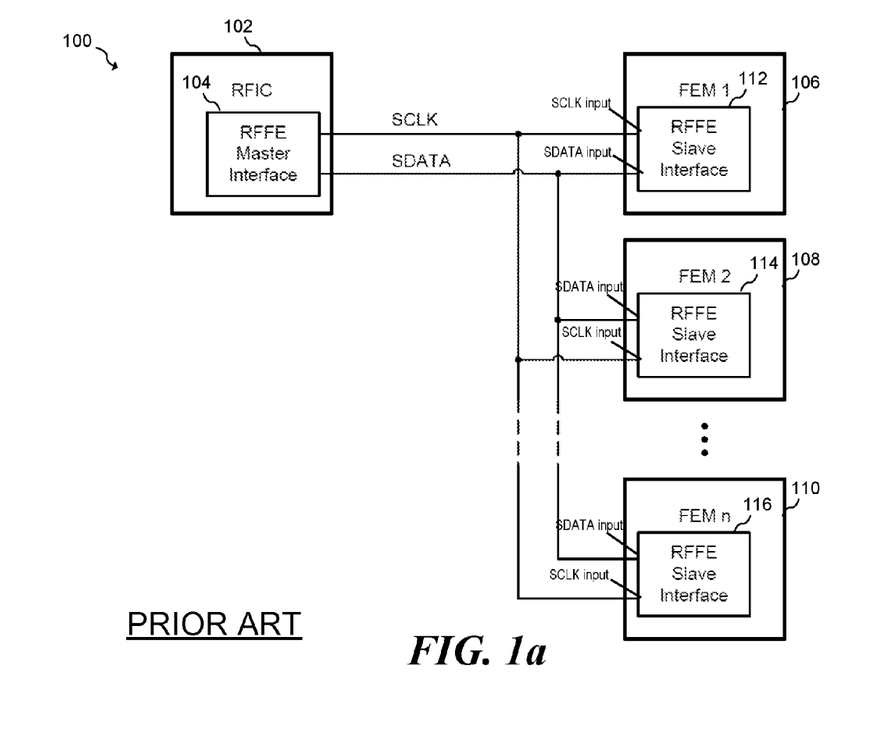
FIGS. 1a-b illustrates a block diagram and a timing diagram for a RFFE bus system.

FIG. 1a illustrates conventional MIPI RFFE system 100 having radio frequency integrated circuit (RFIC) 102 coupled to front end modules (FEM) 106, 108 and 110. RFIC 102 may contain RF transceiver circuitry, and front end modules 106, 108, and 110 may contain low noise amplifiers, power amplifiers, RF switches, bandpass filters, and the like. RFIC 102 also contains RFFE master interface 104, which functions as a bus master for a MIPI RFFE bus. RFFE master interface 104 communicates with RFFE slave interfaces 112, 114 and 116 within FEMs 106, 108 and 110, respectively via clock signal SCLK and data signal SDATA. The MIPI RFFE bus also has its own external and switchable supply voltage for the I/O interface (VIO). In conventional RFFE bus systems, each RFFE slave device is identified by a slave identifier (USID), manufacturer ID, and product ID. The MIPI Specification allows up to 15 slaves to be on the bus and specifies the address range of the component types. The manufacturer ID is defined by the MIPI Alliance and the product ID is defined by the manufacturer. If, however, two identical RFFEs, for example, two devices of the same kind produced by the same manufacturer, are coupled to the same SCLK and SDATA signals, a bus conflict may occur, and RFFE master interface 104 may be unable to distinguish between the two identical RFFE devices. In some conventional embodiments, this situation may be addressed by using additional pins to independently enable, disable or address identical FEM's.

Figure 1B:
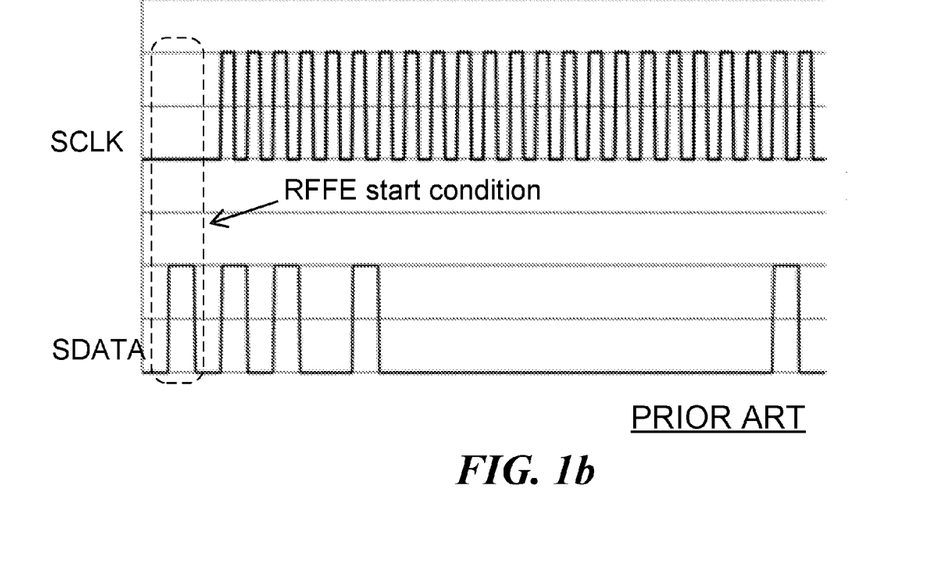

FIG. 1b illustrates a timing diagram of a MIPI RFFE bus interface showing one example of the RFFE protocol. Here, a transmission starts with an asynchronous RFFE start condition. At the beginning of a data transmission, data signal SDATA is pulsed high and then low, while clock signal SCLK is low before clock signal SCLK begins toggling. The protocol continues with possible command sets (read/write command), which are defined in the MIPI RFFE specification.

Figure 2:
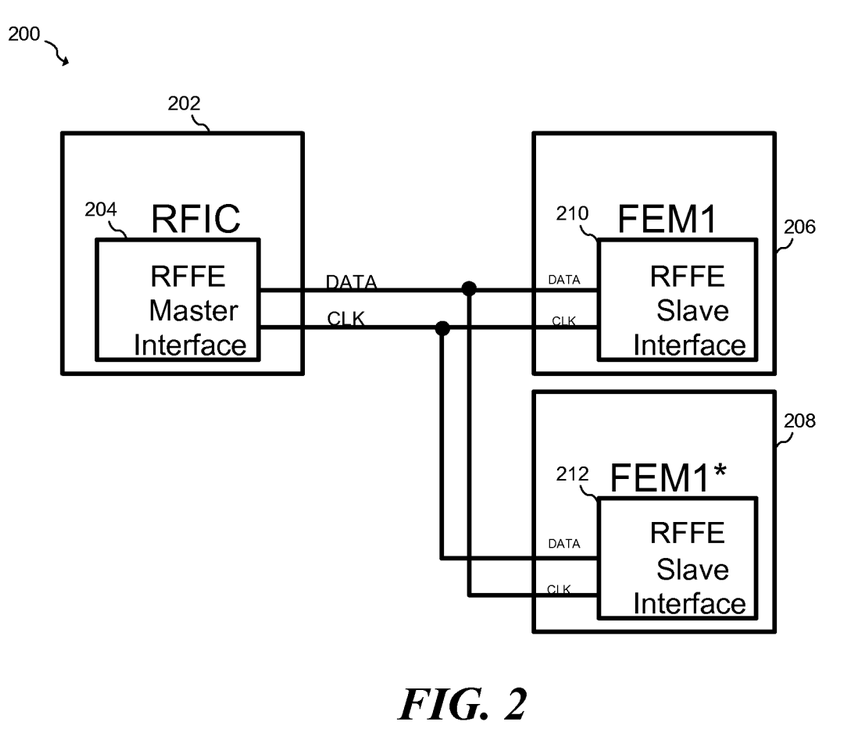
FIG. 2 illustrates a block diagram of an embodiment bus system.

FIG. 2 illustrates bus system 200 according to an embodiment of the present invention. Here, RFIC 202 coupled to FEMs 206 and 208, which may be identical modules. In an embodiment, the DATA and SCLK lines of RFFE master interface 204 is coupled to the DATA and CLK inputs, respectively of RFFE slave interface 210 of FEM 206, but are coupled to the CLK and DATA inputs, respectively of RFFE slave interface 212 of FEM 208. In embodiments of the present invention, RFFE slave interfaces 210 and 212 are configured to determine whether the CLK and DATA pins have been interchanged by sensing the identity of the CLK and DATA pins. If a RFFE slave interfaces senses that the CLK and DATA pins are reversed, as in the case of RFFE 212, the RFFE slave interface reprograms the USID and/or the product ID within the device, such that the two identical RFFE slave interface devices become independently addressable by the RFFE master interface 204. In alternative embodiments, other identifying registers may be modified.

Figure 3:
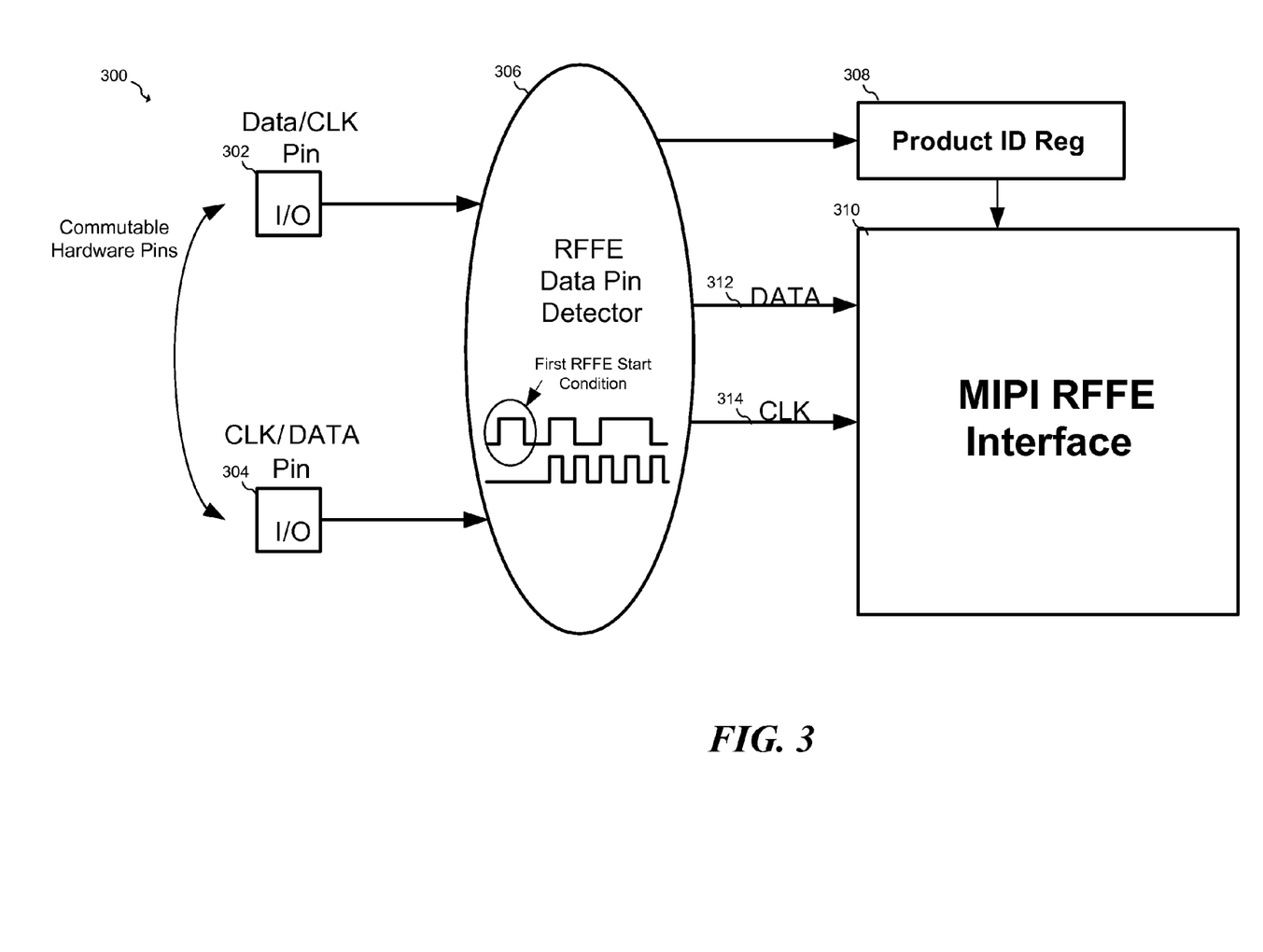
FIG. 3 illustrates a block diagram of an embodiment bus slave device.

FIG. 3 illustrates bus slave interface 300 according to an embodiment of the present invention. Bus slave interface 300 has data pin that detects whether commutable hardware pins 302 and 304 or data and clock pins respectively or detects whether commutable hardware pins 302 and 304 or clock and data pins respectfully. Once the identity of these pins are detected, data pin detector 306 routes the correct signals to data as clock inputs 312 and 314 to MIPI RFFE interface 310. In an embodiment, data pin detector 306 also modifies product ID register 308 according to the polarity of commutable hardware pins 302 and 304. In some embodiments of the present invention register 308 may also be a register that contains the slave identifier instead of the product ID. It even further embodiments of the present invention, other ID registers may be modified instead of or addition to the product ID or the slave ID.

In an embodiment, data pin detector 306 determines the identity of commutable hardware pins 302 and 304 by detecting an RFEE start condition on these pins. For example if data pin detector 306 determines that the first data pulse occurs on pin 302, data pin detector 306 routes the data on pin 302 to DATA signal 312, and routes the clock on pin 304 to CLK signal 314. If, on the other hand, data pin detector 306 determines that the first data pulse occurs on pin 304, data pin detector 306 routes the data on pin 304 to DATA signal 312, and routes the clock on pin 302 to CLK signal 314.

Figure 4:
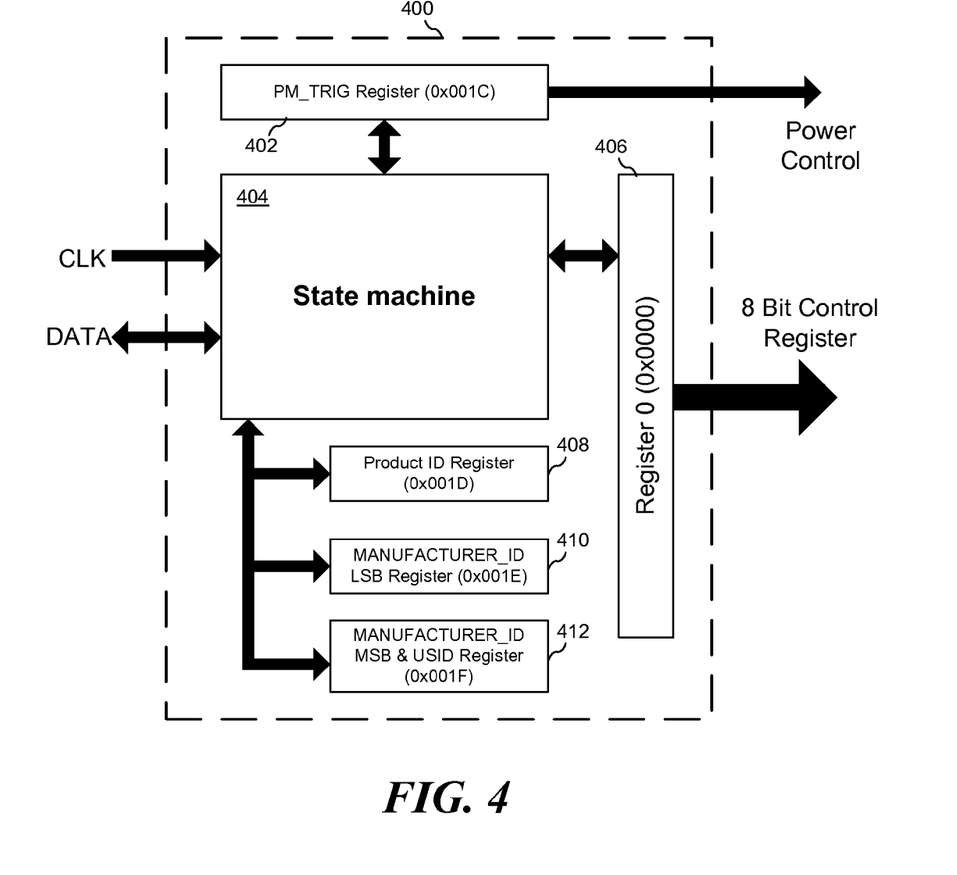
FIG. 4 illustrates an embodiment bus interface circuit.

FIG. 4 illustrates an embodiment RFFE slave interface 400, which may be used to implement block 310 in FIG. 3. Slave interface 400 has state machine 404 as well as various registers 402 406 408 410 and 412. State machine 404 may operate according to the MIPI RFFE specification; however in alternative embodiments of the present invention other bus interface protocols may be used. PM_TRIG register 402 is addressable by the interface bus and may control the power modes of the device to which the slave interface is coupled. Register 406 may be used to control various parameters of the front and device to switch the slave interface is controlling. For example, register 406 may be used to control the switch state of an antenna switch, the gain settings of an adjustable gain amplifier. Product ID register 408 may contain the product ID, manufacturer ID register 410 may contain the manufacturer ID, and manufacturer ID MSB and USID register may contain the MSB of the manufacturer ID and the slave identifier. In an embodiment of the present invention, the slave identifier in 412 may be alterable by data pin detector 306 shown in FIG. 3. In some embodiments, interface 400 may also include other registers, such as spare registers, to extend the functionality of the interface. It should be understood that the RFFE interface illustrated in FIG. 4 is just one example of many possible embodiment interface architectures. In alternative embodiments of the present invention, interface 400 may support other protocols such as inter-integrated circuit ($I^2C$), system management bus (SMB), or serial peripheral interface (SPI) without chip select (CS).

Figure 5:
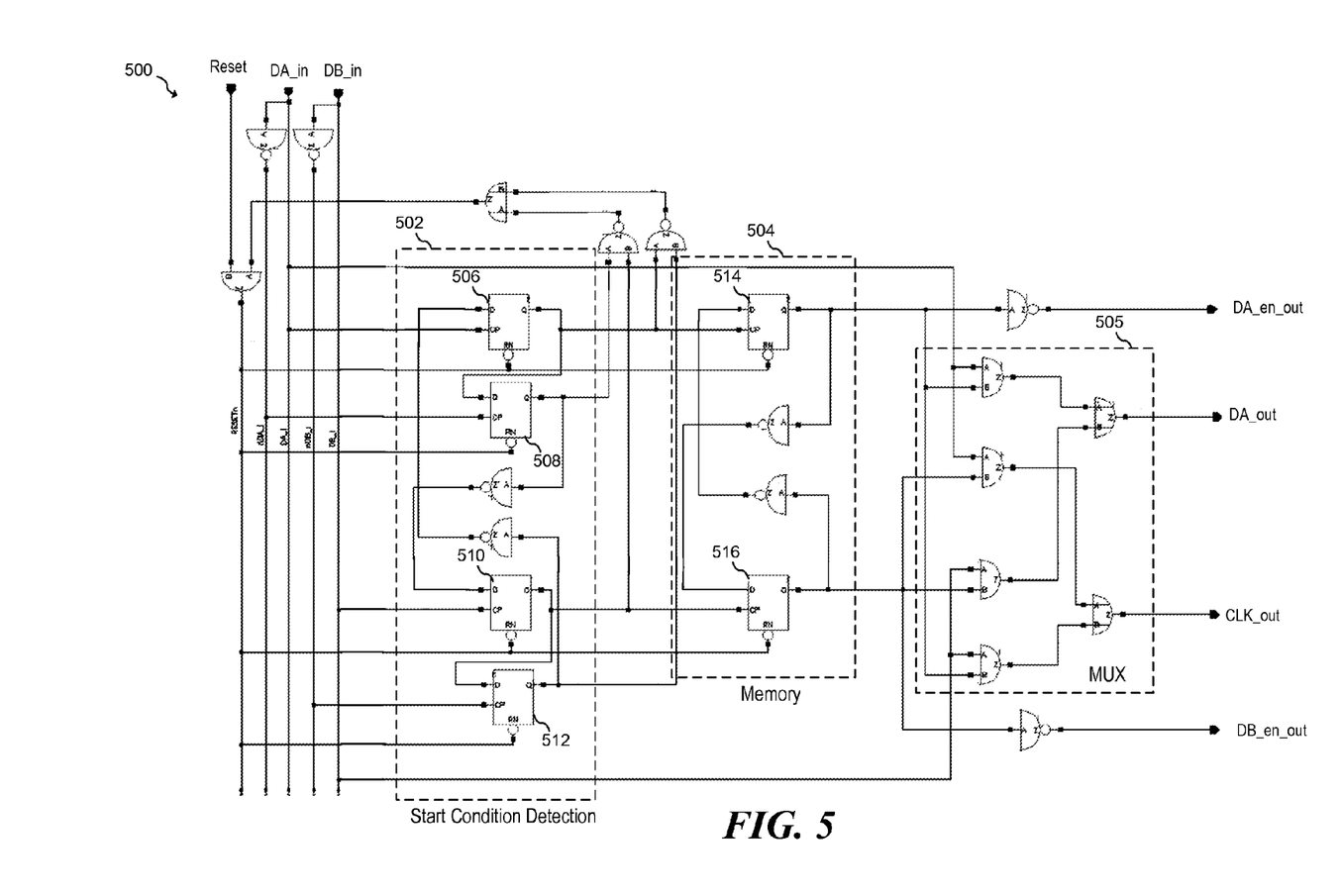
FIG. 5 illustrates a schematic of an embodiment pin detection and routing circuit.

FIG. 5 illustrates a schematic diagram of an embodiment data pin detector 500 that may be used, for example, to implement data pin detector 306 illustrated in FIG. 3. In an embodiment, signals DA_in and DB_in and represent signals on the input pins, and signals DA_out and CLK_out represent the data and clock inputs to the slave bus interface. Data pin detector 500 determines which of DA_in or DB_in is the CLK and DATA signals and routes these signals to output pins DA_out and CLK_out accordingly via multiplexer block 505.

In an embodiment, the data pin detector 500 is placed in an initial state after a reset pulse asserted via signal Reset. In some embodiments, this reset pulse is provided by the system at initial power up. Start condition detection block 502 determines observes both inputs DA_in and DB_in and waits for a RFFE start condition. This RFFE start condition is sensed by detecting the first data pulse using flip-flops 506 and 508 to detect a data pulse on line DA_in or by using flip-flops 510 and 512 to detect a data pulse on line DB_in. After an occurrence of an RFFE start condition, memory block 504 stores the detected pin allocation via flip-flops 514 and 516. In an embodiment, output signals DA_en_out and DB_en_out may be used to manipulate the slave ID and/or product ID code once the pin configuration is detected. In the depicted embodiment, both DA_en_out and DB_en_out are high after Reset is asserted. If DA_in is determined to be the DATA pin, signal DA_en_out goes low while signal DB_en_out remains high. Conversely, if DB_in is determined to be the DATA pin, signal DB_en_out goes low while signal DA_en_out remains high.

It should be appreciated that the circuit shown in FIG. 5 is just one of many implementation examples of an embodiment data pin detector. In alternative embodiments of the present invention, other equivalent logic structures may be used. In further embodiments that use different interface protocols, other logic may be used according to the particular system, its specifications, and the particular protocol being implemented. In further embodiments, data pin detector logic may be implemented, for example, by using Very High Speed Integrated Circuit (VHSIC) Hardware Description Language (VHDL) and/or Verilog source code and other logic synthesis techniques known in the art.

Figure 6:
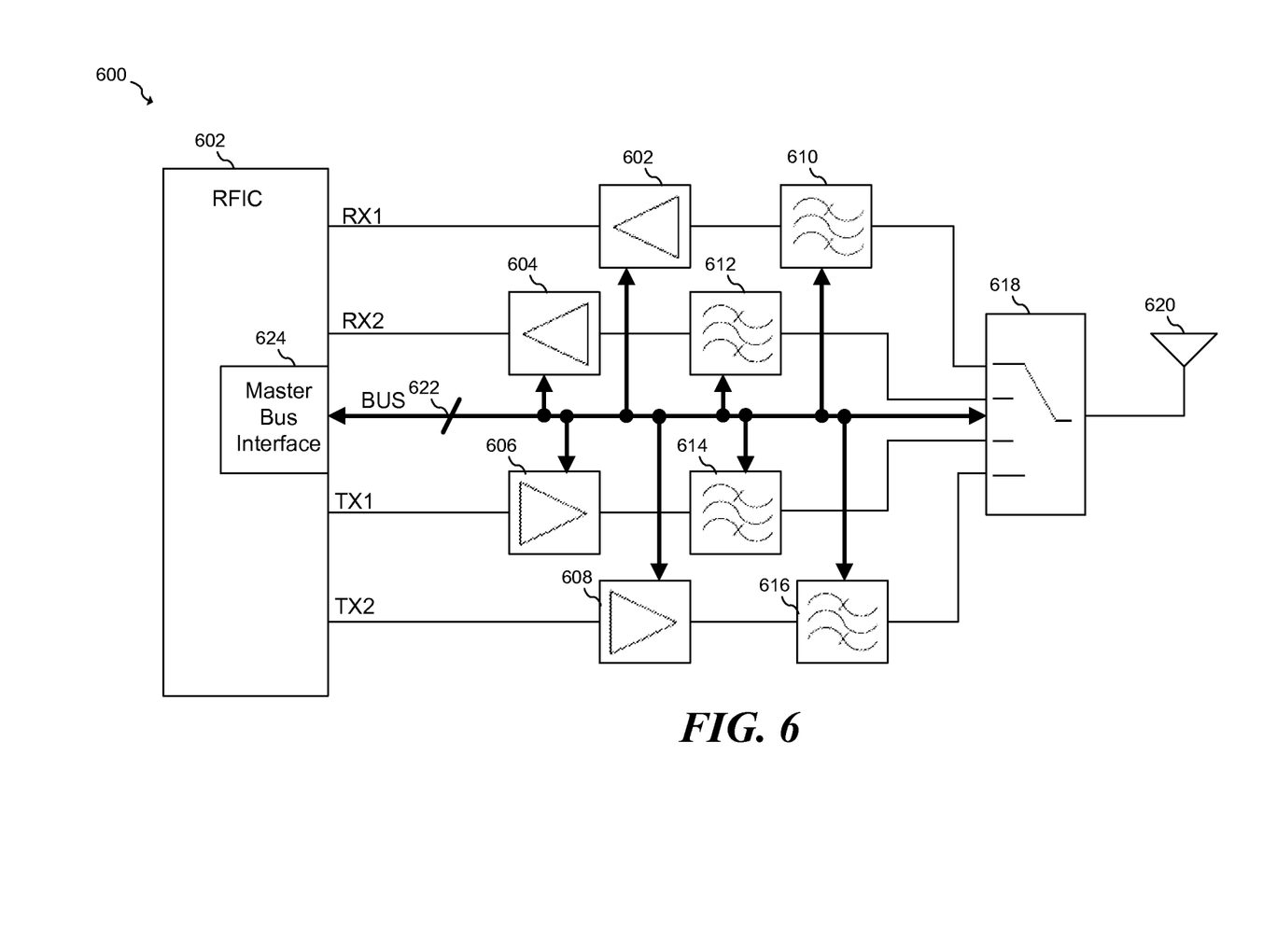
FIG. 6 illustrates a block diagram of a RF system that utilizes an embodiment bus.

FIG. 6 illustrates a block diagram of RF system 600 that utilizes an embodiment bus interface. An RFIC 602 may be for example a transceiver chip or chipset that implements any one of many radio frequency protocols such as Global System for Mobile Communications (GSM), Universal Mobile Telecommunications System (UMTS), Long Term Evolution (LTE), Code Division Multiple Access 2000 (CDMA2000) and Worldwide Interoperability for Microwave Access (WiMAX). In an embodiment, RFIC 602 has two receive input paths RX1 and RX2 and two transmit output paths TX1 and TX2. Receive input path RX1 is coupled to low noise amplifier (LNA) 602 and bandpass filter 610, receive input path RX2 is coupled to LNA 604 and bandpass filter 612, transmit output path TX1 is coupled to power amplifier (PA) 606 and bandpass filter 614, and transmit output path TX2 is coupled to PA 608 and bandpass filter 616. Each signal path is selectively coupled to antenna 620 via antenna switch 618.

In an embodiment, blocks 602, 604, 606, 608, 610, 612, 614, 616, and 618 are coupled to and controllable by interface bus 622, which contains a DATA line and a CLK line (not shown). Some or all of blocks 602, 604, 606, 608, 610, 612, 614, 616, and 618 may contain embodiment slave bus interfaces. Some block pairs may contain identical devices that are coupled to bus 622 as described above with transposed DATA and clock pins. For example, LNAs 602 and 604 may be identical, PAs 606 and 608 may be identical, bandpass filters 610 and 612 may be identical, and bandpass filters 614 and 616 may be identical. In one example embodiment, the DATA and CLK pins of LNA 602 may be coupled to the DATA and CLK lines of line of bus 622, while the DATA and CLK pins of LNA 602 may be coupled to the CLK and DATA lines of bus 622, respectively in a transposed manner. As such master bus interface 624 in RFIC may address these identical blocks using separate slave and/or product IDs after system initialization using embodiment systems and methods described above.

It should be appreciated that embodiments of the present invention may be applied to other systems besides RF systems. For example, embodiment concepts may be applied to various types of data interfaces that are directed toward other various applications such as, but not limited to sensor interfaces, automotive data interfaces, and serial data interfaces.

In accordance with an embodiment, a method of operating a bus interface circuit includes detecting a start sequence in a plurality of input terminals. The plurality of input terminals may include a first input terminal and a second input terminal. The method also includes determining whether the first input terminal and the second input terminal is a data terminal and a clock terminal respectively, or whether the first input terminal and the second input terminal is a clock terminal and a data terminal, respectively based on detecting the start sequence. The method further includes routing the first input terminal to a data terminal and the second input terminal to a clock terminal if the first input terminal and the second input terminal or determined to be a data terminal and a clock terminal, respectively, and routing the first input terminal to the clock terminal and the second input terminal to the data terminal of the first input terminal and the second input terminal or determined to be clock terminal and a data terminal, respectively.

In an embodiment, the method further includes changing the address of the bus interface circuit of the first input terminal and the second input terminal is a clock terminal and the data terminal, respectively, based on the determining. The address of the bus interface circuit may be a slave identifier address of a slave device.

In an embodiment, the method further includes receiving commands from a digital bus coupled to the first input terminal and the second input terminal. The method may also include changing operational state of the radio frequency device based on the received commands. The method may further include operating the bus interface circuit. Operating the bus interface circuit may include operating a radio frequency front and control interface.

In some embodiments, determining whether the first input terminal and the second of the terminals of data terminal a clock terminal, respectively, includes determining that an initial signal pulses received on the first input terminal before clock pulse is received on the second input terminal. Furthermore, determining whether the first input terminal and the second input terminal is a clock terminal and a data terminal respectively, includes determining that an initial signal pulse is received on the second input terminal before clock pulses received on the first input terminal.

In accordance with a further embodiment, a bus interface circuit includes an interface detection circuit coupled to a first input terminal and the second input terminal. The interface detection circuit is configured to determine whether the first input terminal and the second input terminal is a data terminal and a clock terminal respectively, or whether the first input terminal and the second input terminal is a clock terminal and a data terminal, respectively. The bus interface circuit also includes a routing circuit coupled to the interface detection circuit. The routing circuit may be configured to couple the first input terminal to a data interface terminal and couple the second input terminal to a clock interface terminal if the interface detection circuit determines that the first input terminal and the second input terminal is a data terminal and a clock terminal, respectively. The routing circuit may also be configured to couple the first input terminal to a clock interface terminal and couple the second input terminal to a data interface terminal if the interface detection circuit determines that the first input terminal and the second input terminal is a clock terminal and a data terminal respectively.

In an embodiment, the bus interface circuit also includes bus interface logic coupled to the data interface terminal and the clock interface terminal. In some embodiments, the bus interface logic includes a radio frequency front end interface. The bus interface logic may include the state machine and a plurality of control registers.

In some embodiments, the bus interface logic includes an identification register coupled to the interface detection circuit. The interface detection circuit may be configured to change the value of the identification register with the interface detection circuit determines that the first input terminal and the second input terminal is a clock terminal and a data terminal respectively. The bus interface logic may include bus interface logic for slave device, and the identification register me include a slave identification register.

In some embodiments, the bus interface circuit may also include controllable RF component coupled to the bus interface logic. The controllable RF component may be controllable via the first and second input terminals.

In some embodiments, the interface detection circuit is configured to determine that the first input terminal and the second input terminal is a data terminal and a clock terminal respectively, if an initial signal pulses received on the first input terminal before a clock pulse is received on the second terminal. The interface detection circuit may also be configured to determine that the first input terminal and the second input terminal is a clock terminal and a data terminal respectively if an initial signal pulses received on the second input terminal before a clock pulse is received on the first input terminal. In an embodiment, the bus interface circuit may be disposed on an integrated circuit.

In accordance with a further embodiment, a system includes a digital bus that includes a data line and a clock line. The system also includes a first slave interface device having a first input terminal coupled to the data line did a second input terminal coupled to the clock line. Also included is a second slave interface device having a first input terminal coupled to the clock line and a second input terminal coupled to the data line. The second slave device and the first slave device are identical circuits having a same initial identification address. In some embodiments the second slave device is configured to change its initial identification address to a second identification address upon detecting that the first input terminal is coupled to the clock line and that the second input terminal is coupled to the data line. The second slave interface device may detect that the first input terminal is coupled to the clock line and that the second input terminal is coupled to the data line by detecting an initial signal pulse on the second input terminal before clock pulse is received on the first terminal.

In an embodiment, the first slave interface device is coupled to a first radio frequency component controllable via the digital bus and addressable by the initial identification address. The second slave interface device is coupled to a second radio frequency component controllable via the digital bus and addressable by the second identification address.

Advantages of some embodiments of the present invention include the ability to address identical blocks in an MIPI RFFE system without adding additional pins and/or without having to separately manipulate VIO power supply pins during system startup.

A further advantage of some embodiments includes increased flexibility in MIPI RFFE system design due to the simple usage of identical components.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A system comprising:
   a digital bus comprising a data line and a clock line;
   a first slave interface device having an input terminal A coupled to the data line and an input terminal B coupled to the clock line; and
   a second slave interface device having an input terminal A coupled to the clock line and an input terminal B coupled to the data line, wherein the second slave interface device and the first slave interface device are identical circuits such that the input terminal A of the first slave interface device corresponds to the input terminal A of the second slave interface device and the input terminal B of the first slave interface device corresponds to the input terminal B of the second slave interface device, and wherein the first slave interface device and second slave interface device have a same initial identification address,
   wherein the data line and clock line are interchangeable into the input terminal A and input terminal B of the first slave interface device and interchangeable into the input terminal A and input terminal B of the second slave interface device, and
   wherein the first slave interface device and the second slave interface device are each configured to:
      receive a start condition on the input terminal A and the input terminal B,
      when the start condition is a first start condition, couple the input terminal A to a data interface terminal and couple the input terminal B to a clock interface terminal, and
      when the start condition is a second start condition, couple the input terminal B to the data interface terminal and couple the input terminal A to the clock interface terminal.

2. The system of claim 1, wherein the second slave interface device is configured to change its initial identification address to a second identification address upon detecting that that its input terminal A is coupled to the clock line and that its input terminal B is coupled to the data line.

3. The system of claim 2, wherein the second slave interface device is configured to detect that its input terminal A is coupled to the clock line and that its input terminal B is coupled to the data line by detecting an initial signal pulse on its input terminal B before a clock pulse is received on its input terminal A.

4. The system of claim 2, wherein:
   the first slave interface device is coupled to a first radio frequency (RF) component controllable via the digital bus and addressable by the initial identification address; and
   the second slave interface device is coupled to a second radio frequency (RF) component controllable via the digital bus and addressable by the second identification address.

5. The system of claim 1, wherein the first slave interface device and the second slave interface device each comprise:
   an interface detection circuit coupled to the input terminal A and to the input terminal B, the interface detection circuit configured to receive the start condition and detect that the start condition is the first start condition or detect that the start condition is the second start condition; and
   a routing circuit coupled to the interface detection circuit, the routing circuit configured to perform the
      coupling of the input terminal A to the data interface terminal and couple the input terminal B to the clock interface terminal when the first start condition is detected, and
      coupling of the input terminal A to the clock interface terminal and couple the input terminal B to the data interface terminal when the second start condition is detected.

6. The system of claim 5, wherein the first slave interface device and the second slave interface device each further comprise bus interface logic coupled to the data interface terminal and the clock interface terminal.

7. The system of claim 1, wherein the first slave interface device and the second slave interface device each comprise:
   a start condition detection circuit coupled to the input terminal A and to the input terminal B, the start condition detection circuit configured to detect the first start condition when an initial signal pulse is detected on the input terminal A before the input terminal B, and to detect the second start condition when the initial signal pulse is detected on the input terminal B before the input terminal A;
   a memory coupled to the start condition detection circuit, the memory configured to be in a first state when the first start condition is detected and to be in a second state when the second start condition is detected; and
   a multiplexer coupled to the memory and to the start condition detection circuit, the multiplexer configured to route the input terminal A and the input terminal B by performing the coupling of the input terminal A to the data interface terminal and the input terminal B to the clock interface terminal when the memory is in a first state, and coupling of the input terminal A to the clock interface terminal and the input terminal B to the data interface terminal when the memory is in the second state.

8. A system comprising:

a digital bus comprising a first bus line and a second bus line;

a first slave interface device having a first input terminal coupled to the first bus line and a second input terminal coupled to the second bus line; and a second slave interface device having a first input terminal coupled to the second bus line and a second input terminal coupled to the first bus line, wherein the first slave interface device and the second slave interface device each comprise:

an interface detection circuit coupled to the first input terminal and to the second input terminal, the interface detection circuit configured to detect a start sequence on the first input terminal and the second input terminal, and a routing circuit coupled to the interface detection circuit, the routing circuit configured to couple the first input terminal to a first interface terminal and couple the second input terminal to a second interface terminal when the start sequence comprises a first start sequence detected by the interface detection circuit, and couple the first input terminal to a second interface terminal and couple the second input terminal to a first interface terminal when the start sequence comprises a second start sequence detected by the interface detection circuit.

9. The system of claim 8, wherein the first slave interface device and the second slave interface device each comprise bus interface logic coupled to the first interface terminal and to the second interface terminal.

10. The system of claim 9, wherein the bus interface logic comprises a radio-frequency (RF) front-end control interface.

11. The system of claim 10, further comprising:

a first radio frequency (RF) component coupled to the bus interface logic of the first slave interface device; and a second radio frequency (RF) component coupled to the bus interface logic of the second slave interface device.

12. The system of claim 9, wherein the bus interface logic comprises a state machine and a plurality of control registers.

13. The system of claim 9, wherein the bus interface logic comprises an identification register coupled to the interface detection circuit, wherein the interface detection circuit is configured to change a value of the identification register when the interface detection circuit detects the second start sequence.

14. The system of claim 8, wherein:

the first bus line comprises a data line;
the second bus line comprises a clock line;
the first interface terminal comprises a data terminal; and
the second interface terminal comprises a clock terminal.

15. A method of operating a slave interface circuit comprising a first input terminal coupled to a first bus line of a digital interface bus, and a second input terminal coupled to a second bus line of the digital interface bus, the method comprising:

detecting an identification sequence on the first input terminal and the second input terminal;

routing the first input terminal to a first interface terminal and the second input terminal to a second interface terminal when a first identification sequence is detected based on the detecting; and routing the first input terminal to the second interface terminal and the second input terminal to the first interface terminal when a second identification sequence is detected.

16. The method of claim 15, wherein the first bus line comprises a data line;
the second bus line comprises a clock line;
the first interface terminal comprises a data terminal; and
the second interface terminal comprises a clock terminal.

17. The method of claim 15, wherein:

the first identification sequence comprises a first start sequence; and
the second identification sequence comprises a second start sequence.

18. The method of claim 15, further comprising changing an address of the slave interface circuit when the second identification sequence is detected.

19. The method of claim 15, further comprising receiving commands from the digital interface bus.

20. The method of claim 15, further comprising operating the slave interface circuit, wherein operating the slave interface circuit comprises operating a radio-frequency (RF) front-end control interface.

* * * * *